(12) United States Patent
Chan et al.

(10) Patent No.: US 7,567,677 B1
(45) Date of Patent: Jul. 28, 2009

(54) NOISE REDUCTION SCHEME FOR A COMPUTER SYSTEM

(75) Inventors: Rix S. Chan, Dakota Dunes, SD (US);
Vijay Zaver, Dakota Dunes, SD (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 09/216,378

(22) Filed: Dec. 18, 1998

(51) Int. Cl.
*A61F 11/06* (2006.01)
(52) U.S. Cl. .................................. 381/71.1; 700/94
(58) Field of Classification Search ....... 381/71.1–71.9, 381/72, 73.1, 74, 94.1, 94.7, 370; 700/94; 379/428.01, 430, 388.01, 388.02
See application file for complete search history.

(56) References Cited

U.S. PATENT DOCUMENTS

| | | | | |
|---|---|---|---|---|
| 4,856,047 A | | 8/1989 | Saunders ..................... 379/57 |
| 5,043,721 A | | 8/1991 | May ....................... 340/825.44 |
| 5,166,973 A | | 11/1992 | Hoff ............................ 379/57 |
| 5,251,263 A | * | 10/1993 | Andrea et al. .............. 381/71.6 |
| 5,363,444 A | * | 11/1994 | Norris ....................... 379/430 |
| 5,373,555 A | | 12/1994 | Norris et al. ................ 379/430 |
| 5,375,174 A | * | 12/1994 | Denenberg ................... 381/71 |
| 5,402,466 A | | 3/1995 | Delahanty ................... 379/44 |
| 5,425,105 A | * | 6/1995 | Lo et al. ...................... 381/71 |
| 5,459,458 A | | 10/1995 | Richardson et al. .... 340/825.52 |
| 5,479,408 A | | 12/1995 | Will .......................... 370/94.1 |
| 5,481,615 A | * | 1/1996 | Eatwell et al. ................ 381/71 |
| 5,561,703 A | | 10/1996 | Arledge et al. ............... 379/57 |
| 5,623,242 A | | 4/1997 | Dawson, Jr. et al. ..... 340/311.1 |
| 5,828,768 A | * | 10/1998 | Eatwell et al. .............. 381/333 |
| 6,118,878 A | * | 9/2000 | Jones .......................... 381/72 |
| 6,259,792 B1 | * | 7/2001 | Lambrecht ................. 381/73.1 |
| 6,278,786 B1 | * | 8/2001 | McIntosh ................... 381/71.6 |
| 6,304,434 B1 | * | 10/2001 | Markow ..................... 361/683 |
| 6,453,042 B1 | * | 9/2002 | Roach et al. ................ 379/395 |

FOREIGN PATENT DOCUMENTS

| | | |
|---|---|---|
| DE | 29723559 | 10/1998 |
| WO | 95/31805 | 5/1994 |

* cited by examiner

*Primary Examiner*—Vivian Chin
*Assistant Examiner*—Lun-See Lao
(74) *Attorney, Agent, or Firm*—Pearne & Gordon LLP

(57) ABSTRACT

A noise reduction scheme is incorporated into a computer system for reducing environmental background noise when a user is listening to audio output through a standard set of headphones. The noise reduction scheme utilizes the processing power of the computer system as well as built-in components of the computer for enhancing the audio quality heard by the user. Environmental background noise is received by a built-in microphone, wherein a reciprocal noise canceling signal is generated by the computer's microprocessor. The reciprocal noise canceling signal is then mixed with audio from the computer system for reducing the environmental background noise heard by a user.

24 Claims, 3 Drawing Sheets

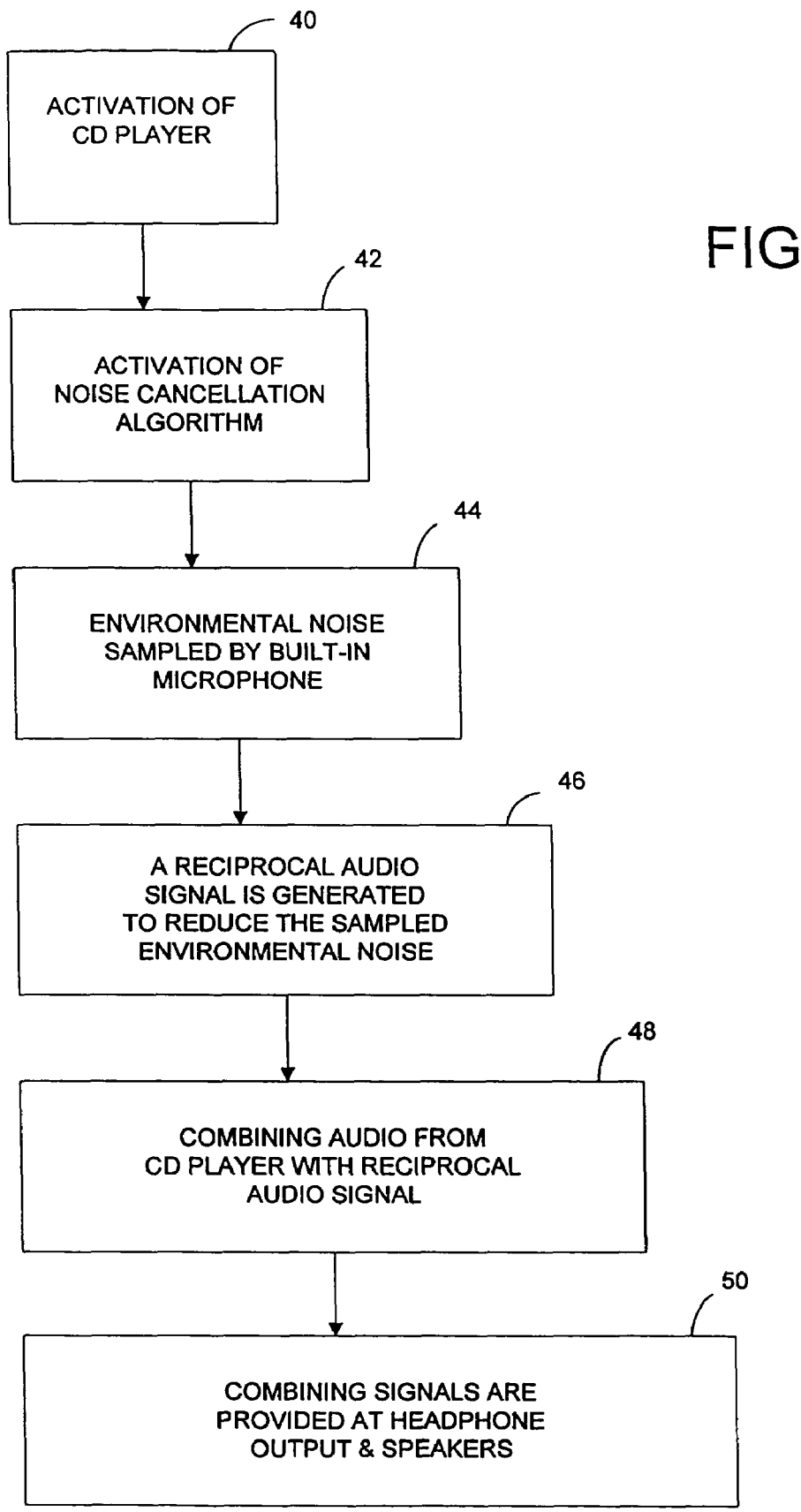

NOISE REDUCTION SCHEME FOR A COMPUTER SYSTEM

TECHNICAL FIELD OF THE INVENTION

The present invention relates generally to noise reduction schemes and in particular to a noise reduction scheme implemented within a computer system.

BACKGROUND OF THE INVENTION

Mobile computer systems, such as laptop or notebook computers, usually include a CD-ROM drive which can be used for music enjoyment. Typically, a user listens to an audio CD through a standard set of headphones while typing or using the computer. Further, audio may be enjoyed by the user from other sources, such as DVD drives and other storage devices, and network connections as well as part of games and other applications which provide an audio component.

Since a notebook computer is mobile, the user is able to operate the computer in a variety of locations while still listening to audio via the headphones. However, many of these locations present a noisy environment to the user. The quality of the audio heard by the user is reduced when mixed with background noise from the local environment. For instance, when a user listens to music while operating the notebook computer on an airplane flight, engine noise is mixed in with the audio provided from the CD, even when using headphones. Office locations also present noisy environments to the user.

Consumer electronic manufacturers have introduced standalone headphones that have a noise reduction system incorporated directly into the headphone. Since a standard headphone set does not contain any processing capability, manufacturers of the noise reduction headphones add a microcontroller or digital signal processor (DSP) to provide a noise canceling signal. Noise reduction systems detect ambient sound surrounding the user and generate a sound wave which is opposite the sensed ambient sound. The opposite sound wave is combined with the ambient sound, resulting in cancellation of the ambient sound.

Because these standalone headphones have noise cancellation capability, they are more costly than a standard headphone set. The addition of a microcontroller or a DSP, and a built-in microphone to collect the ambient noise contribute directly to the increased cost, which in general may be as much as five times more than the standard headphone set.

Therefore, what is needed is a cost effective way to reduce or cancel environmental background noise normally heard by a user through a standard set of headphones while listening to audio while using a mobile computer system. For the reasons stated above, and for other reasons stated below which will become apparent to those skilled in the art upon reading and understanding the present specification, there is a need in the art to provide a noise reduction scheme for a mobile computer system without incorporating additional circuitry directly into a standard headphone set.

SUMMARY OF THE INVENTION

A noise reduction scheme is incorporated into a mobile computer system for reducing environmental background noise when a user is listening to audio output of a mobile computer. A noise cancellation algorithm is executed by the computer's microprocessor for generating a noise cancellation signal in response to environmental background noise detected by a microphone built into the mobile computer system. A digital signal processor within the mobile computer system mixes the noise cancellation signal with audio provided by the mobile computer for providing an enhanced audio signal to a user listening to the audio output through a standard set of headphones.

In one embodiment, a noise reduction scheme implemented within a computer system having an optical disc drive is presented. A built-in microphone detects ambient noise. A noise cancellation algorithm executed by a microprocessor generates a noise cancellation signal responsive to the detected ambient noise. A digital signal processor mixes the noise cancellation signal with an audio signal provided from a compact disc playing in the optical disc drive, wherein the mixed signal is applied to a headphone output connection. In further embodiments, the source of the sound is from the group consisting of DVD, network connection, hard disk drive and various application programs which utilize sound.

In another embodiment, a method of reducing ambient noise normally heard by a user through headphones when listening to audio from a mobile computer system is provided. The method comprises the steps of detecting the ambient noise, executing a noise cancellation algorithm wherein a noise cancellation signal is generated in response to the detected ambient noise, and mixing the noise cancellation signal with the audio from the compact disc wherein the mixed signal is applied to the headphones.

An advantage of implementing a noise cancellation scheme within a mobile computer system is that environmental background noise is reduced when a user listens to audio via a standard set of headphones. This is particularly beneficial to a user operating the computer in a noisy environment, such as on an airplane or in a crowded office. Because the noise cancellation scheme is implemented within the mobile computer system, a standard set of headphones are used for listening to audio directed to the headphone audio connection.

Therefore, a noise reduction scheme implemented within a mobile computer system allows components normally inherent with the computer system to support a noise cancellation algorithm. In different embodiments of the invention alternative methods of executing the noise cancellation algorithm of varying scope are described. For instance, the noise cancellation algorithm is automatically executed by the computer's microprocessor when the optical disc drive is active or the algorithm is manually executed that a software interface. Still other and further embodiments, aspects and advantages of the invention will become apparent by reference to the drawings and by reading the following detailed description.

BRIEF DESCRIPTION OF THE DRAWINGS

FIG. 3 is a flow chart showing one embodiment of the steps necessary for providing a noise reduction scheme for a computer.

DETAILED DESCRIPTION OF THE EMBODIMENTS

In the following detailed description of the embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense, and the scope of the present inventions are defined only by the appended claims.

The present invention is a noise reduction scheme implemented within a mobile computer system for reducing environmental background noise heard by a user while listening to audio through a standard set of headphones. A noise cancellation signal is generated by the computer's main processor in response to environmental background noise detected by a built-in microphone. The noise cancellation signal is then mixed with audio output provided by an application program or device such as a CD drive, DVD drive, network connection or other device for canceling or reducing environmental background noise heard by the user while listening to such audio output through the headphones. A mobile computer system serving as an environment for the present invention is first described followed by a block diagram of an embodiment of a noise reduction scheme implemented within such a computer system. A flow chart describing the processing steps for a noise reduction scheme is also presented.

Figure 1:
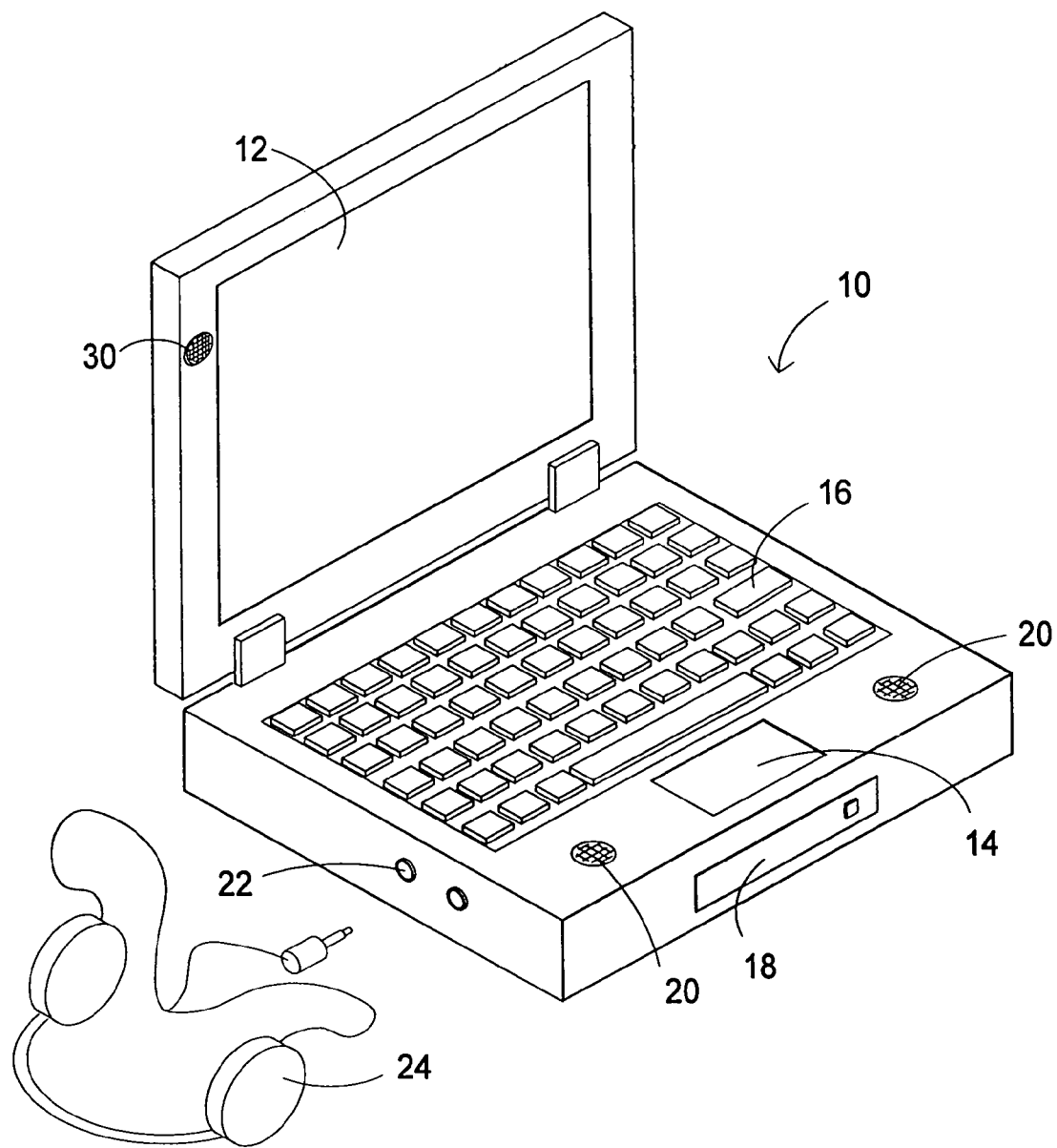
FIG. 1 illustrates a computer serving as an environment for the present invention.

FIG. 1 illustrates a computer 10 serving as an environment for the present invention. Computer 10 is a mobile computer such as a laptop or notebook computer, and may be of any type, including a Gateway Solo series computer system. The notebook computer 10 includes an integrated monitor 12, a pointing device 14, a keyboard 16, and a compact disc-read only memory (CD-ROM) optical disc drive 18 for receiving and playing a CD. Reference number 18 is also representative of any other device which provides audio, such as a network connection, a DVD drive, or other similar device, including applications such as games running on computer 10. An integrated source of power is also provided in computer 10. Audio output from the computer 10 is directed to an audio output connection such as built-in speakers 20 or a headphone output connection 22. As illustrated in FIG. 1, a standard set of headphones 24 are connected to the headphone output connection 22 for bypassing the speakers 20 and for allowing a user to listen to audio via the headphones 24. A built-in microphone 30 is also integrated into the notebook computer 10.

The notebook computer 10 further includes a microprocessor, random access memory (RAM), read only memory (ROM), and one or more storage devices, such as a hard disk drive, and a floppy disk drive (into which a floppy disk can be inserted). The construction and operation of such notebook computers are well known in the art. The presented invention is not limited to notebook computers, and is applicable to other computing systems that can provide audio output, such as desktop computer systems, set top boxes, and combined television and computer or set top box devices.

The monitor 12 permits the display of information for viewing by a user of the notebook computer 10. The monitor 12 is a flat panel display, such as a liquid crystal display (LCD). Other types of displays are acceptable, such as CRTs, plasma and projection to name a few. The pointing device 14 permits the control of the screen pointer provided by the graphical user interface of operating systems such as versions of Microsoft Windows. The notebook computer 10 is not limited to any particular pointing device 14. Such pointing devices include a mouse, a touch pad, a trackball and a pointing stick.

Figure 2:
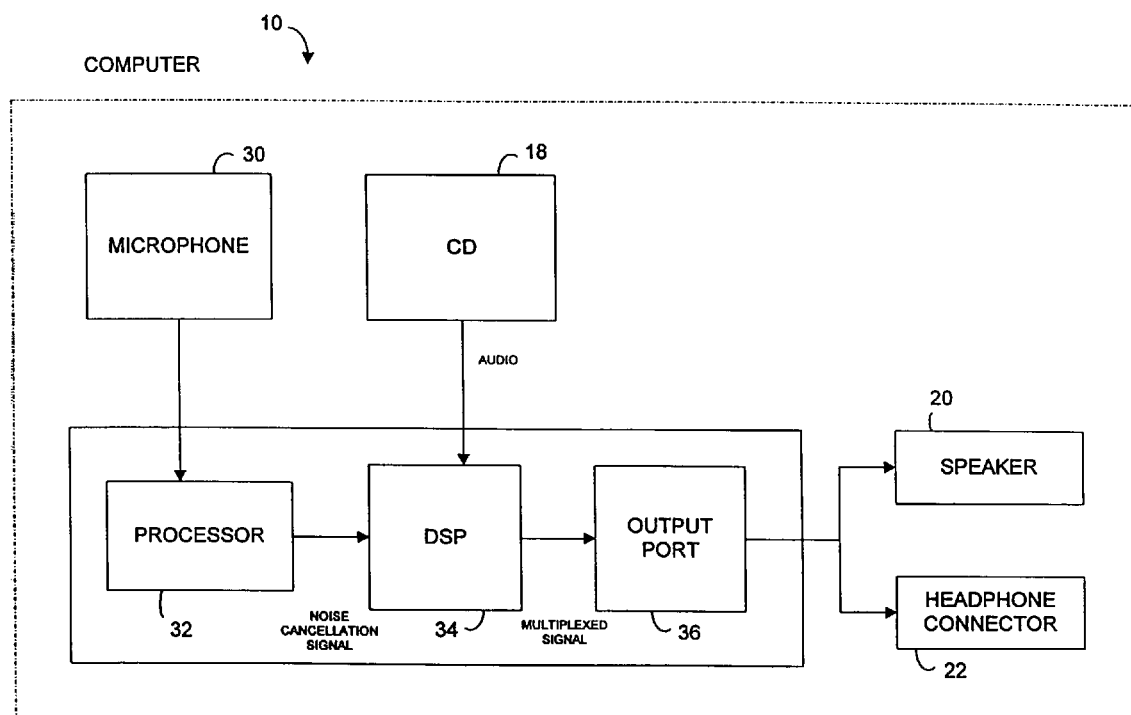
FIG. 2 is a block diagram of an embodiment of a noise reduction scheme implemented within a computer according to the teachings of the present invention.

FIG. 2 is a block diagram of an embodiment of a noise reduction scheme implemented within a notebook computer 10 according to the teachings of the present invention. Environmental background noise is detected by the built-in microphone 30. The placement and the number of microphones utilized for detecting ambient background noise is not limited by the present invention. In one embodiment, a single microphone 30 is placed near the upper portion of the monitor 12, as illustrated in FIG. 1. In another embodiment, multiple microphones (not shown) are placed on the backside of the computer 10. A microphone may be remote or wired and moved as desired by a user to provide optimal cancellation.

The microphone(s) 30 should not be placed directly adjacent to the keys on the keyboard 16 in order to properly cancel noise generated by a user typing. If the microphone 30 detects a higher level of noise because of its proximity to the keyboard 16, then the noise cancellation signal generated includes over-correction for a noise not heard at the same level by the user. In another alternative embodiment of the noise cancellation scheme, a profile for key clicks is included as part of the noise reduction scheme so that a noise cancellation signal is generated without over compensating for key click noise when a user is typing on the keys. Therefore, an imbalance in the keyboard noise level detected by the microphone 30 and the noise level as heard by the user is minimized.

Analog noise detected by the microphone 30 passes through an analog to digital convertor (not shown) for conversion into a digital signal. The digitized noise signal is applied to the microprocessor 32 of the computer 10. The microprocessor 32 executes a noise cancellation module implementing well known algorithms to generate a reverse or negative noise signal in response to the received digitized noise signal. The present invention is not limited to any particular noise cancellation algorithm, which varies in complexity and processing requirements. However, noise cancellation algorithms are well known to those skilled in the art.

Execution of the noise cancellation algorithm by the microprocessor 32 is activated by a user through a software interface. In an alternative embodiment, the noise cancellation algorithm is activated automatically when the CD-ROM drive 18 or other such source of audio output is activated, which may be detected in one of several well known ways, including receiving the signals causing activation of such sources.

The noise cancellation signal generated by the microprocessor 32 is received by a digital signal processor (DSP) 34. A sound board contained within the computer 10 typically contains one or more DSPs 34, one of which is utilized for mixing the noise cancellation signal with the audio output of the computer 10 using known mixer functionality. The resultant or multiplexed signal is converted back to an analog signal and applied to an audio output port 36.

The audio output port 36 is coupled to one or more speakers 20 and to a headphone output connector 22. The headphone output connector 22 is adapted to receive a standard set of headphones 24. When a user is listening to CD or other audio via the headphones 24, the audio quality heard by the user is enhanced because the environment or ambient background noise has been reduced.

Although not as practical, audio quality heard using the speaker(s) 20 would also be enhanced by operation of the noise reduction scheme. However, a more sophisticated noise cancellation algorithm would be required, which would demand greater processing requirements from the microprocessor 32.

By utilizing built-in components of the mobile notebook computer 10, a user is able to enjoy enhanced sound quality when listening to audio from a CD or other source using a standard set of headphones 24. Built-in components include the microphone 30, the CD-ROM 18 drive or other source, the headphone output connection 22, the microprocessor 32, and the DSP 34. All of these components are typically inherent with the mobile notebook computer 10. However, if the computer 10 is missing any of the required components, they can be added as necessary.

FIG. 3 is a flow chart showing one embodiment of the steps necessary for providing a noise reduction scheme within a notebook computer 10. The flow chart may be representative of a computer program written in any of several languages, such as C++, which is an object oriented language, or in procedural code. The number of objects or modules of code may or may not correspond one to one with the steps represented in the flow chart. Further, the code may be run from main memory, and loaded from secondary storage such as cd rom, disk drive, network connection, floppy or any type of machine or computer readable medium. Further, the flow chart may also be implemented in software, hardware, firmware or any combination thereof.

Referring to step 40, the CD-ROM drive 18 is activated. Activation means that a CD has been inserted into the CD-ROM drive 18 and audio encoded within the CD is directed to an audio output port 36.

In step 42, the noise cancellation algorithm residing within the microprocessor 32 is activated. In one embodiment, the noise cancellation algorithm is automatically activated in response to an active CD-ROM drive 18. In another embodiment, the user activates the noise cancellation algorithm through a software interface such as a common graphical user interface, drop down menu selection, command line or other type of interface. Implementation of either one of these steps are well known to those skilled in the art.

In step 44, a built-in microphone 30 samples environmental or ambient background noise. This is followed by step 46, wherein a negative or reciprocal audio signal is generated in response to the noise detected in step 44. After the reciprocal noise signal has been generated, it is combined with the audio signal provided by the CD-ROM drive 18 (step 48). The combined signal is applied at either a speaker(s) 20 or to a headphone output connection 22 wherein a user listens to the audio through a standard set of headphones 24.

A noise reduction scheme has been described for a mobile computer 10 for enhancing sound quality heard by a user listening to audio from a CD using a standard set of headphones 24. A built-in microphone 30 detects environmental background noise, wherein a noise cancellation algorithm residing in the microprocessor 32 of the computer 10 is activated to generate a negative or reciprocal signal in response to the detected noise. This negative or reciprocal noise signal is mixed in a DSP with audio from the CD playing in a CD-ROM drive 18. The resultant audio signal reduces the environmental background noise normally heard by a user when listening to audio from the CD through a standard set of headphones 24.

Although specific embodiments have been illustrated and described herein, those of ordinary skill in the art will appreciate that any elements or arrangements of elements capable of achieving the same purpose may be substituted for the specific forms shown. In particular, while a CD-ROM drive 18 has been described with respect to the flowchart of FIG. 3, other devices, such as DVD drives, network connections over which sound files are obtained and application programs such as games can also cause activation of the noise cancellation algorithm which activated. This patent is intended to cover all adaptations or variations of the invention, limited only by the following claims and equivalents thereof.

What is claimed is:

1. A personal computer comprising: a housing; a microphone built into the housing to detect noise ambient to the housing; a processor integrated into the housing, the microphone being coupled to the processor; a noise cancellation module operable on the processor, the noise cancellation module generating a noise cancellation signal responsive to the ambient noise detected by the microphone; and a digital signal processor coupled to the noise cancellation module and configured to mix the noise cancellation signal with an audio signal provided from a desired source to output a mixed signal, the digital signal processor being connected to a standard headphone compatible audio output connection integrated on the housing such that the mixed signal is available at the audio output connection; wherein the mixed signal reproduced by headphones connected to the audio output connection reduces noise perceived by a user wearing the headphones and listening to the mixed signal through the headphones; wherein the noise cancellation module applies a key click profile to the ambient noise detected by the microphone to compensate for a keyboard noise level detected by the microphone in the noise cancellation signal.

2. The personal computer of claim 1 further comprising an optical disc drive integrated into the housing of the computer, the optical disc drive being configured to playback media to provide the audio signal to the digital signal processor.

3. The personal computer of claim 1 wherein the noise cancellation module comprises a software program running on the processor.

4. The personal computer of claim 3 wherein the processor is the central processing unit for the computer system.

5. The personal computer of claim 1 wherein the digital signal processor is located on a sound board integrated into the housing.

6. The personal computer of claim 1 wherein the computer system is a mobile computer.

7. The personal computer of claim 1 wherein the audio source comprises an optical disc player.

8. The personal computer of claim 1 wherein the mixed audio signal and noise cancellation signal are further directed to a speaker integrated into the case of the computer.

9. The personal computer of claim 1 additionally comprising at least one speaker integrated into the housing, the digital signal processor being connected to the at least one speaker such that the mixed signal is available to the at least one speaker and the standard headphone compatible output.

10. A method of reducing ambient noise normally heard by a user through headphones when listening to audio provided via a mobile computer system, comprising: detecting noise ambient to a case of the mobile computer system through a microphone built-in to the case of the mobile computer system; generating a noise cancellation signal based on the detected ambient noise; and mixing the noise cancellation signal with an audio signal from an audio source on the mobile computer system; supplying the mixed signal to a standard headphone compatible audio output connection on the case of the mobile computer system such that the mixed signal is available at the audio output connection; wherein the mixed signal reproduced by headphones connected to the audio output connection reduces the ambient noise perceived by a user wearing the headphones and listening to the mixed signal through the headphones; wherein the noise cancellation module applies a key click profile to the ambient noise detected by the microphone to compensate for a keyboard noise level detected by the microphone in the noise cancellation signal.

11. The method of claim 10 and further comprising converting the detected ambient noise to an electrical signal.

12. The method of claim 10 wherein generating the noise cancellation signal is performed by a processor of the mobile computer system, and mixing the noise cancellation signal is performed by a sound card of the mobile computing system that is connected to the standard headphone compatible audio output connection of the mobile computer system.

13. The method of claim 10 wherein generation of the noise cancellation signal is activated automatically when an optical disc drive of the mobile computer system is activated.

14. The method of claim 10 wherein generation of the noise cancellation signal is initiated manually via a software interface.

15. A machine readable medium having machine readable instructions stored thereon for causing a computer to perform the steps comprising:
   detecting environmental background noise through a microphone integrated into a case of the computer;
   converting the detected environmental background noise into an electrical signal;
   generating a noise cancellation signal based on the electrical signal by a microprocessor integrated into the computer; and
   mixing the noise cancellation signal with an audio signal provided by an application program operating on the computer or a device integrated into the computer; and
   directing the mixed audio signal to a standard headphone compatible audio output connection on the case of the computer such that the mixed signal is available at the audio output connection;
   wherein the mixed signal reproduced by headphones connected to the audio output connection reduces noise perceived by a user wearing the headphones and listening to the mixed signal through the headphones;
   wherein the step of generating a noise cancellation signal includes applying a key click profile to the electrical signal to compensate for a keyboard noise level detected by the microphone in the noise cancellation signal generated.

16. The machine readable medium of claim 15 wherein the step of generating a noise cancellation signal is initiated and performed automatically when an optical disc drive of the computer is active and producing the audio signal.

17. The machine readable medium of claim 15 wherein the step of generating a noise cancellation signal is activated through a software interface.

18. The machine readable medium of claim 15 wherein the mixing of the audio signal and noise cancellation signal is performed by a processor integrated into the case of the computer.

19. A personal computer comprising:
   a portable housing having a keyboard portion and a monitor portion in a clamshell arrangement;
   a microprocessor integrated into the keyboard portion of the housing;
   at least one speaker integrated into the keyboard portion of the housing;
   memory integrated into the housing and coupled to the microprocessor,
   a storage device integrated into the housing and coupled to the microprocessor;
   an audio source integrated into the housing and configured to produce an audio signal;
   a microphone integrated into the display portion of the housing to detect noise ambient to the housing, the microphone being coupled to the microprocessor to provide a signal to the microprocessor corresponding to a level of the ambient noise;
   a noise cancellation module operating on the microprocessor to generate a noise cancellation signal responsive to the signal corresponding to the level of detected ambient noise;
   a digital signal processor configured to mix the noise cancellation signal with the audio signal provided from the audio source integrated into the housing to output a mixed signal, the digital signal processor being connected to a standard headphone compatible audio output connection on the housing of the mobile computer system such that the mixed signal is applied to the audio output connection, the digital signal processor being connected to the at least one speaker integrated on the housing of the mobile computer system such that the mixed signal is applied to the at least one speaker;
   wherein the mixed signal reproduced by headphones connected to the audio output connection reduces noise perceived by a user wearing the headphones and listening to the mixed signal through the headphones; and
   wherein the noise cancellation module applies a key click profile to the ambient noise detected by the microphone to compensate for a keyboard noise level detected by the microphone in the noise cancellation signal generated.

20. The personal computer of claim 19 and further comprising a display device integrated into the housing.

21. A personal computer system with integrated noise reduction, comprising:
   a personal computer housing;
   a processor integrated into the housing;
   an audio source integrated into the housing and configured to produce an audio signal, the audio source including an optical disc drive configured to playback media to provide the audio signal;
   a microphone integrated into the housing to detect noise ambient to the housing, the microphone being coupled to the microprocessor to provide a signal to the processor corresponding to an ambient noise level;
   a noise cancellation module operable on the processor, the noise cancellation module generating a noise cancellation signal responsive to the signal from the microphone corresponding to the ambient noise level; and
   a digital signal processor coupled to the noise cancellation module and configured to mix the noise cancellation signal with an audio signal provided from a desired source to output a mixed signal, the digital signal processor being connected to a standard headphone compatible audio output connection integrated on the housing such that the mixed signal is available at the audio output connection;
   wherein the mixed signal reproduced by headphones connected to the audio output connection reduces noise perceived by a user wearing the headphones and listening to the mixed signal through the headphones; and
   wherein the noise cancellation module applies a key click profile to the ambient noise detected by the microphone to compensate for a keyboard noise level detected by the microphone in the noise cancellation signal.

22. The system of claim 21 wherein the noise cancellation module comprises a software program running on a processor.

23. The system of claim 21 wherein the processor is the central processing unit for the computer system.

24. The system of claim 21 wherein the digital signal processor is located on a sound card integrated into the housing.

* * * * *